(12) United States Patent
Pensel et al.

(10) Patent No.: US 6,714,347 B2  
(45) Date of Patent: Mar. 30, 2004

(54) MICROSCOPE WITH A REGION OF MODIFIABLE LENGTH

(75) Inventors: Juergen Pensel, Altstaetten (CH); Ulrich Sander, Rebstein (CH)

(73) Assignee: Leica Microsystems AG, Heerbrugg (CH)

( * ) Notice: Subject to any disclaimer, the term of this patent is extended or adjusted under 35 U.S.C. 154(b) by 70 days.

(21) Appl. No.: 10/073,881

(22) Filed: Feb. 14, 2002

(65) Prior Publication Data

US 2002/0149844 A1 Oct. 17, 2002

(30) Foreign Application Priority Data

Feb. 14, 2001 (DE) .......................... 101 06 696

(51) Int. Cl.⁷ .................... G02B 21/00; G02B 21/20
(52) U.S. Cl. .................. 359/381; 359/368; 359/375; 359/384
(58) Field of Search ................. 359/368, 372, 359/376–384, 388, 405, 431–432; 351/200–247

(56) References Cited

U.S. PATENT DOCUMENTS

| 4,576,450 A | 3/1986 | Westphal | 359/382 |
| 4,652,094 A * | 3/1987 | Kitajima | 359/375 |
| 5,287,219 A * | 2/1994 | Hildebrand et al. | 359/368 |
| 5,519,531 A * | 5/1996 | Sato | 359/380 |
| 5,532,872 A * | 7/1996 | Sakamoto et al. | 359/384 |
| 6,072,622 A * | 6/2000 | Biber | 359/368 |
| 6,327,080 B1 * | 12/2001 | Brinkmann et al. | 359/381 |

FOREIGN PATENT DOCUMENTS

| DE | 33 05 650 | 8/1984 |
| DE | 34 02 354 | 7/1985 |

* cited by examiner

*Primary Examiner*—Thong Nguyen  
(74) *Attorney, Agent, or Firm*—Foley & Lardner

(57) ABSTRACT

A microscope, which may be a stereomicroscope, includes: at least one objective; at least one eyepiece; at least one optical component configured to form a beam path from the objective to the eyepiece, where each optical component includes a lens, mirror, or deflection prism; and a tube configured to enclose a portion of the beam path, including at least one region of modifiable length configured to connect to at least one optical correction element and configured so that the optical correction element may be inserted into or removed from the portion of the beam path. The microscope may include a linkage between the tube and the correction lens configured to pivot or slide the correction lens as a function of a length of the region of modifiable length.

14 Claims, 2 Drawing Sheets

MICROSCOPE WITH A REGION OF MODIFIABLE LENGTH

CROSS-REFERENCE TO RELATED PATENT APPLICATIONS

This invention claims priority to German Priority Application 101 06 696.1, filed on Feb. 14, 2001, which is incorporated herein by reference in its entirety.

BACKGROUND OF THE INVENTION

Surgical microscopes, in particular, must be capable of being used in a variety of utilization positions during surgery, and for that purpose must be very rapidly and universally adjustable. DE 33 05 650 A1, for example, discloses a unit, preferably usable as a surgical microscope, that comprises, between the eyepieces and the objective part, two arms joined articulatedly to one another. In the unit's interior the optical beam path extends through lenses and deflectable mirrors. This arrangement is, however, very complex in terms of design, limited in adjustability, and requires a great deal of room.

Also known from DE 34 02 354 A1 is a microscope, usable preferably in a stationary fashion, that makes possible a height adjustment of the eyepiece with respect to the specimen stage. This height adjustability allows the unit to be optically adapted to operating persons of different heights, and allows for a fatigue-free operation over a long period of time. The adjustability is accomplished by the fact that a carriage which carries the eyepieces is displaceable with respect to the objective carrier along a supporting column equipped with V-guides. Such displaceability is desirable, however, only if the optical beams in the region between the objective part and viewing part or eyepiece extend in parallel fashion, since otherwise the image appearing in the eyepiece will be optically modified by the displacement. This displaceability is moreover limited, since with greater displacements an undesirable vignetting occurs, in which beyond a specific setting, only a portion of the original image is visible in the eyepiece.

SUMMARY OF THE INVENTION

It is therefore an object of the invention to create a microscope, universally adjustable in the region between the objective and the eyepiece, capable of a modification of its overall length without vignetting, so that a user has optimum viewing conditions.

The present invention provides for a microscope, which may be a stereomicroscope, comprising: at least one objective; at least one eyepiece; at least one optical component configured to form a beam path from the objective to the eyepiece, wherein each optical component comprises at least one of a lens, mirror, and deflection prism; and a tube configured to enclose a portion of the beam path, comprising at least one region of modifiable length configured to connect to at least one optical correction element and configured so that the at least one optical correction element may be inserted into or removed from said portion of the beam path. The microscope may further comprise the optical correction element.

In one aspect of the present invention, either the tube or the microscope itself may be pivotable about a pivot axis that is substantially perpendicular to an axis of the beam path.

In another aspect of the present invention, the region of modifiable length may be configured to be modified by extending it telescopically.

In another aspect of the present invention, the region of modifiable length may be configured to enclose a parallel portion of the beam path. Alternatively, the region of modifiable length may be configured to enclose one of a converging and diverging portion of the beam path.

In another aspect of the present invention, the optical correction element may comprise a correction lens, or group of lenses, configured to be manually or automatically pivoted or slid into and out of the beam path. Alternatively, the optical correction element may comprise a plane-parallel plate.

In another aspect, the present invention may further comprise a linkage between the tube and the correction lens configured to pivot or slide the correction lens as a function of a length of the region of modifiable length.

In another aspect, the present invention may further comprise: at least one sensor configured to detect a length of said region of modifiable length; at least one mechanical drive configured to pivot or slide the correction lens; and a controller between said sensor and said mechanical drive configured to control said mechanical drive as a function of a detection signal received from said sensor.

BRIEF DESCRIPTION OF THE DRAWINGS

The invention will be explained below in more detail with reference to the drawings.

Figure 1:
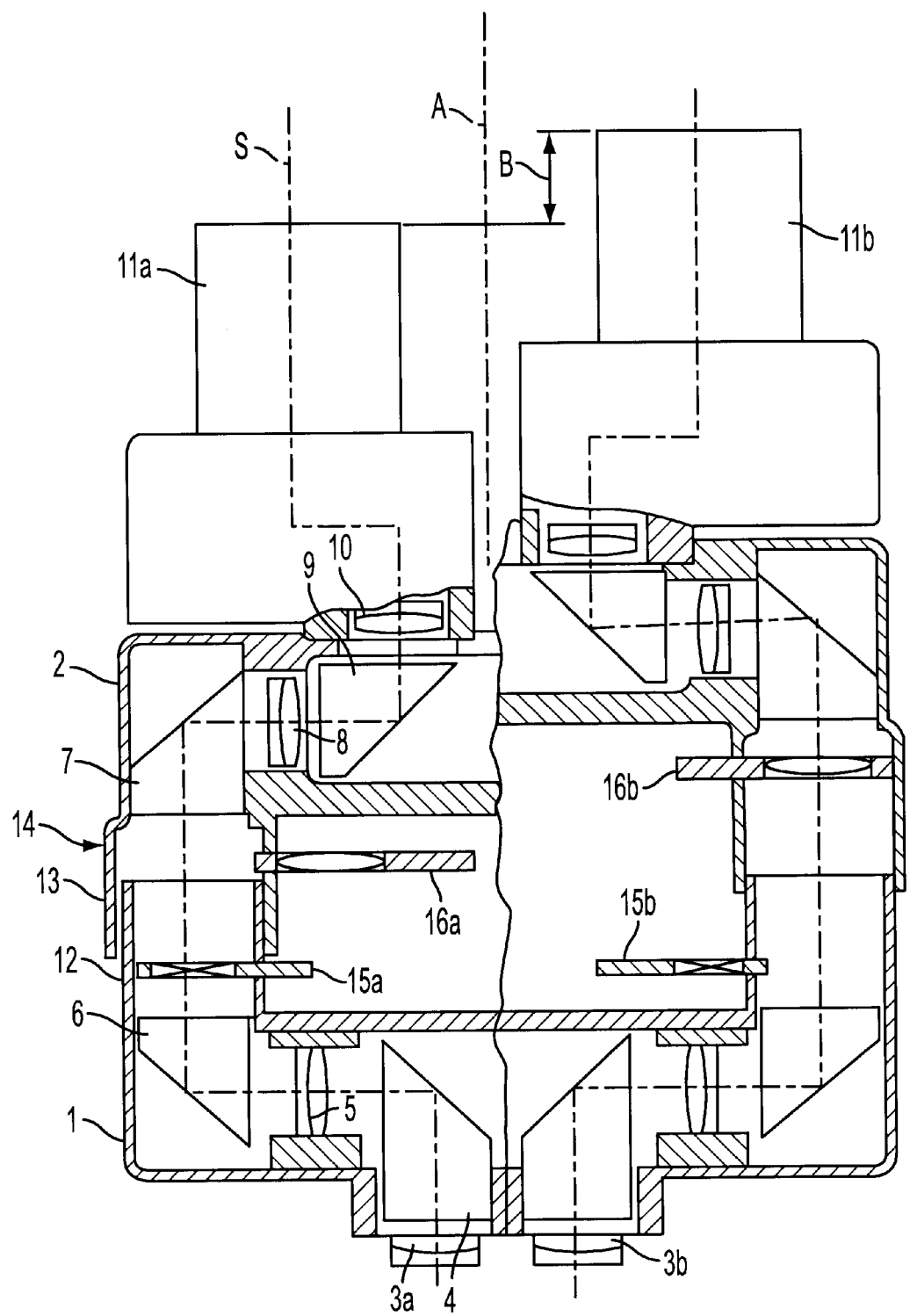
FIG. 1 shows a partial sectional view of a device according to the present invention, configured as a stereomicroscope, the two eyepieces being pulled out to positions of different lengths.

The dimensions are indicated only symbolically in the Figures, and are not to be understood as limiting.

DETAILED DESCRIPTION OF THE PREFERRED EMBODIMENTS

According to the present invention, a tube in the optical beam path comprises at least one region of modifiable length in which optical correction elements are insertable and/or removable as a function of the selected length. An advantage of the insertable and/or removable correction elements is that in every working position of the microscope, the same image area is always visible and sharply imaged in the eyepiece at the desired magnification. The disadvantages of vignetting known from a system of length adjustment in the parallel beam path are thus avoided. The invention eliminates the need to arrange the region of modifiable length in the parallel beam path.

An additional advantage of the present invention is that the adjustable-length region may be pulled out or extended telescopically. This approach is suitable in particular for stereomicroscopes, since it makes possible a very compact design. Elements telescopically displaceable with respect to one another can simultaneously serve as a mechanical guide and as an optical seal for the beam path.

Advantageously, the adjustable-length region may be arranged in a parallel part of the beam path. The necessary correction actions are thus relatively minor over a wide adjustment range, since they need to compensate only for the phenomenon of so-called vignetting. The modifiable-length regions may, however, be arranged in a converging or diverging part of the beam path. Depending on the type of beam path and the particular working position, different correction actions are necessary in each case.

Advantageously, correction lenses—or groups of such lenses—that may be pivoted or slid into and out of the beam path may be provided for correction actions. Individual correction lenses or a combination of correction lenses may be used depending on the need. The correction lenses may be pivoted or slid into the beam path, as a function of the position of the modifiable-length region, by means of a linkage. The simultaneous insertion or removal of several lenses may also be mutually coupled or synchronized by means of the linkage.

An additional advantage of the present invention is that the correction lenses may be automatically pivoted into the beam path as a function of the position of the modifiable-length region. The current position of the adjustable-length region may, for example, be directly sensed mechanically, and used to control or pivot in the correction lenses.

Depending on the need, the correction lenses may exhibit a positive or a negative refractive power. Lenses having different refractive powers may also be used in combination with one another for correction. The invention is not, however, limited to lenses. Plane-parallel plates or the like can also be utilized. An example of a plane-parallel plate is a flat pane of glass of even thickness which, depending on its orientation with respect to the beam path, may cause an axial displacement of the image.

Advantageously, sensors for detecting the position of the modifiable-length region, as well as at least one logic element for controlling the correction elements in relation to a position of the modifiable-length region, may be provided. Such sensors may be, for example, analog or digital displacement measurement systems or so-called limit switches. The signals of the logic element can be directly used to control the insertion or removal of the correction lenses. Alternatively, simple linkages or lever arm designs may be used.

Figure 2:
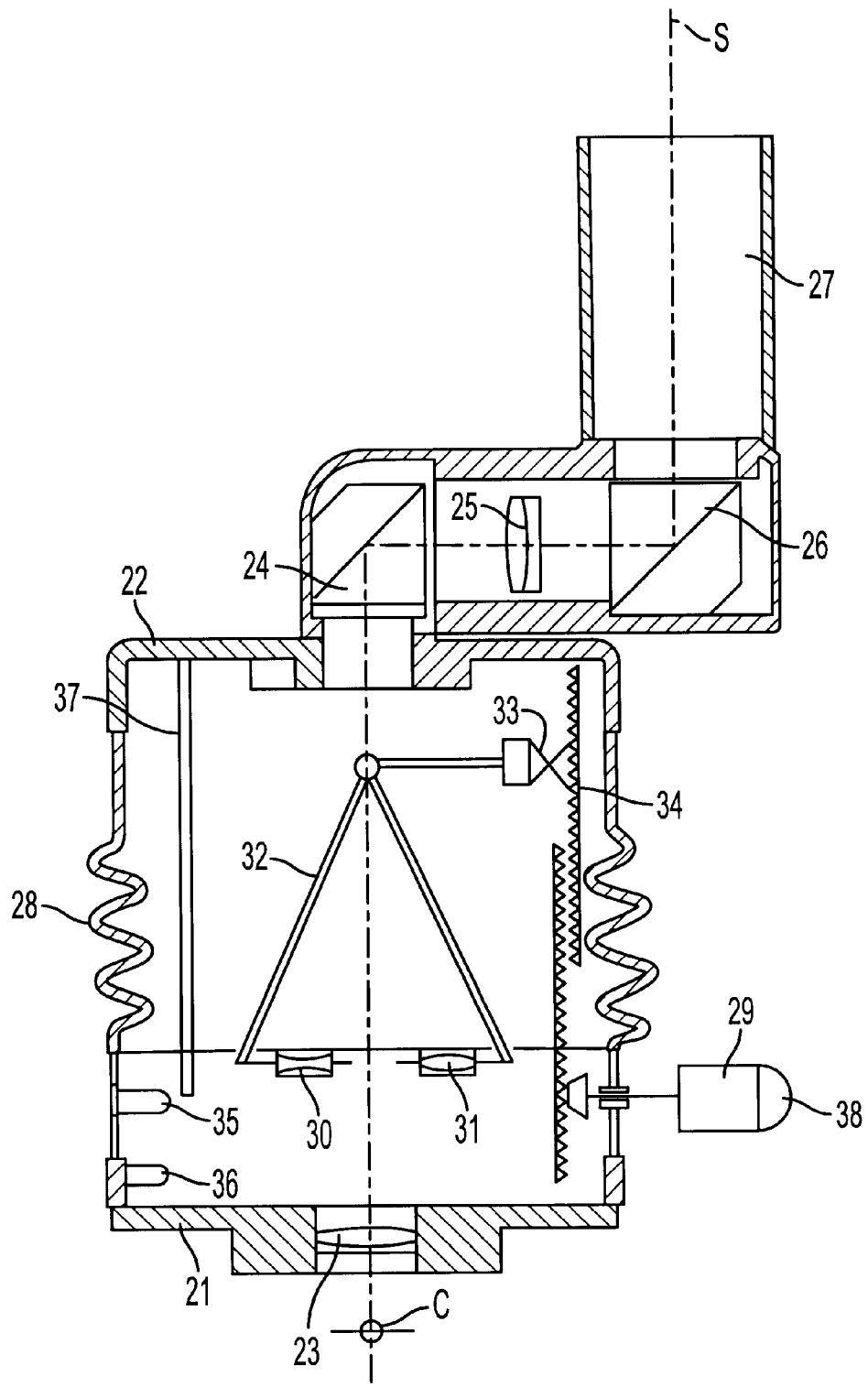
FIG. 2 shows a longitudinal sectional view through an embodiment of a microscope according to the present invention.

For universal adjustability of the microscope, the tube or the microscope may be pivotable about a pivot axis C (shown in FIG. 2) extending substantially perpendicular to beam path S and the plane of FIG. 2. The eyepiece can thus be set in an optimally ergonomic fashion by the viewer without thereby substantially modifying the position of the microscope with respect to the specimen being viewed.

The device visible in FIG. 1 comprises a lower housing part 1 and an upper housing part 2. Upper housing part 2 is displaceable with respect to lower housing part 1 along longitudinal axis A over an adjustment distance B. This displaceability serves for optimum adaptation of the unit to local conditions or to varying requirements of the operator.

Arranged at the lower end of lower housing part 1 are two objectives 3a, 3b. The beam path, indicated as a dot-dash line S, extends in the housing through prisms 4, 6, 7, and 9 and through lenses 5, 8, and 10. Eyepieces 11a, 11b are joined movably to upper housing part 2. This movability allows, for example, for adaptation of the microscope to the individual interpupillary distance of the operator.

Tubular extensions 12, 13, engaging telescopically into one another, on lower housing part 1 and upper housing part 2, respectively, form a tube 14 that can be pulled out or extended telescopically. Engageable (insertable) and disengageable (removable) correction lenses 15a, 15b, and 16a, 16b are arranged in the region of tube 14. These correction lenses 15a, 15b and 16a, 16b are necessary in particular when the beam path between prisms 6 and 7 does not extend in a parallel fashion, or when vignetting is obtrusive. Correction lenses 15a, 15b and 16a, 16b can be purely manually actuated, or also can be automatically controlled as a function of the position to which tube 14 is extended.

Depending on the requirements of the optical system, correction lenses 15a, 15b and 16a, 16b may exhibit a positive or negative refractive power—i.e., they may be configured as converging or diverging lenses. Instead of individual lenses, entire systems of lenses may also be engaged and disengaged. Alternatively, at least lenses 15a, 15b may be plane-parallel plates.

The monocular visible in FIG. 2 and depicted in section comprises a lower housing part 21 and an upper housing part 22 adjustable with respect to each other. An objective 23 is arranged on lower housing part 21. Beam path S, indicated as a dot-dash line, extends through a prism 24, a lens 25, and a further prism 26. An eyepiece 27 is joined to upper housing part 22. A bellows 28 joins lower housing part 21 to upper housing part 22 and thus closes off beam path S externally. A symbolically depicted actuating mechanical drive 29, manually driven or motorized, may adjust eyepiece 27 with respect to objective 23. For compensation of the change in the beam path resulting from adjustment of eyepiece 27, correction lenses 30, 31 may be engaged into and disengaged from beam path S. The correction lenses 30, 31 are joined to a pivoting carrier 32. The actuation of pivoting carrier 32 is accomplished via a linkage 33. Linkage 33 may be mechanically coupled to actuating mechanical drive 29 or to the lower housing part 21, for example, via toothed racks 34. The engagement and disengagement of correction lenses 30, 31 is thus accomplished automatically in accordance with the particular position to which eyepiece 27 is extended. Sensors 35, 36, which coact with a feeler 37 and a logic element or controller 38 connected to actuating mechanical drive 29, may be used to control the motion of the eyepiece 27 with respect to the objective 23.

The embodiment shown in FIG. 2 is depicted as a monocular. The invention is not, however, limited to a monocular. In the case of a device configured, for example, as a stereomicroscope, two such monoculars may be arranged in parallel fashion next to one another.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described to explain the principles of the invention and as a practical application to enable one skilled in the art to utilize the invention in various embodiments and with various modifications suited to the particular use contemplated. It is intended that the scope of the invention be defined by the claims appended hereto and their equivalents.

| PARTS LIST | |
|---|---|
| 1 | Lower housing part |
| 2 | Upper housing part |
| 3a, 3b | Objectives |
| 4 | Prism |
| 5 | Lens |
| 6 | Prism |
| 7 | Prism |
| 8 | Lens |
| 9 | Prism |
| 10 | Lens |
| 11a, 11b | Eyepieces |
| 12 | Extension |
| 13 | Extension |
| 14 | Tube |
| 15a, 15b | Correction lenses |
| 16a, 16b | Correction lenses |
| 21 | Lower housing part |
| 22 | Upper housing part |
| 23 | Objective |

-continued

PARTS LIST

| 24 | Prism |
| 25 | Lens |
| 26 | Prism |
| 27 | Eyepiece |
| 28 | Bellows |
| 29 | Actuating drive |
| 30, 31 | Correction lenses |
| 32 | Pivoting carrier |
| 33 | Linkage |
| 34 | Toothed racks |
| 35, 36 | Sensors |
| 37 | Feeler |
| 38 | Logic element |
| A | Longitudinal axis |
| B | Adjustment difference |
| C | Pivot axis |
| S | Beam path |

What is claimed is:

1. A microscope, comprising:

at least one objective configured to generate an image;

at least one eyepiece;

at least one optical component configured to form a beam path from the objective to the eyepiece, wherein each optical component comprises at least one of a lens, mirror, and deflection prism;

a tube configured to enclose a portion of the beam path, comprising at least one region of modifiable length; and at least one optical correction element movable with respect to the tube and configured to correct one of a lateral movement and an alteration of said image caused by a modification of a length of said region of modifiable length, wherein the tube is configured to connect to the at least one optical correction element and configured so that the at least one optical correction element is insertable into or removable from said portion of the beam path.

2. The microscope as in claim 1, wherein said microscope is a stereomicroscope.

3. The microscope as in claim 1, wherein one of the microscope and the tube is pivotable about a pivot axis that is substantially perpendicular to an axis of the beam path.

4. The microscope as in claim 1, wherein the region of modifiable length is configured to be modified by extending it telescopically.

5. The microscope as in claim 1, wherein the region of modifiable length is configured to enclose a parallel portion of the beam path.

6. The microscope as in claim 1, wherein the region of modifiable length is configured to enclose one of a converging and diverging portion of the beam path.

7. The microscope as in claim 1, wherein said at least one optical correction element comprises a correction lens configured to be pivoted or slid into and out of said beam path.

8. The microscope as in claim 7, wherein said correction lens is configured to be manually pivoted or slid into and out of said beam path.

9. The microscope as in claim 7, wherein said correction lens is configured to be automatically pivoted or slid into and out of said beam path.

10. The microscope as in claim 7, wherein said correction lens comprises a group of lenses.

11. The microscope as in claim 1, wherein said at least one optical correction element comprises a plane-parallel plate.

12. A microscope, comprising:

at least one objective;

at least one eyepiece;

at least one optical component configured to form a beam path from the objective to the eyepiece, wherein each optical component comprises at least one of a lens, mirror, and deflection prism;

at least one optical correction element comprising a correction lens configured to be pivoted or slid into and out of said beam path;

a tube configured to enclose a portion of the beam path, comprising at least one region of modifiable length configured to connect to the at least one optical correction element and configured so that the at least one optical correction element is insertable into or removable from said portion of the beam path; and a linkage between said tube and said correction lens configured to pivot or slide the correction lens such that the Pivoting or sliding of the correction lens at least partially depends on a length of said region of modifiable length.

13. A microscope, comprising:

at least one objective;

at least one eyepiece;

at least one optical component configured to form a beam path from the objective to the eyepiece, wherein each optical component comprises at least one of a lens, mirror, and deflection prism;

at least one optical correction element comprising a correction lens configured to be pivoted or slid into and out of said beam path;

a tube configured to enclose a portion of the beam path, comprising at least one region of modifiable length configured to connect to the at least one optical correction element and configured so that the at least one optical correction element is insertable into or removable from said portion of the beam path;

at least one sensor configured to detect a length of said region of modifiable length;

at least one mechanical drive configured to pivot or slide the correction lens; and a controller between said at least one sensor and said mechanical drive configured to control said mechanical drive such that the pivoting or sliding of the correction lens at least partially depends on a detection signal received from said at least one sensor.

14. A microscope, comprising:

at least one objective;

at least one eyepiece;

at least one optical component configured to form a beam path from the objective to the eyepiece, wherein each optical component comprises at least one of a lens, mirror, and deflection prism;

at least one optical correction element; and a tube configured to enclose a portion of the beam path, comprising at least one region of modifiable length configured to connect to the at least one optical correction element and configured so that the at least one optical correction element is insertable into or removable from said portion of the beam path such that the insertion or removal of the optical correction element at least partially depends on a length of the region of modifiable length.

* * * * *